(12) United States Patent
Zhu et al.

(10) Patent No.: US 11,874,864 B2
(45) Date of Patent: Jan. 16, 2024

(54) METHOD AND SYSTEM FOR CREATING A DOMAIN-SPECIFIC TRAINING CORPUS FROM GENERIC DOMAIN CORPORA

(71) Applicants: KONINKLIJKE PHILIPS N.V., Eindhoven (NL); TRUSTEES OF BOSTON UNIVERSITY, Boston, MA (US)

(72) Inventors: Henghui Zhu, Boston, MA (US); Amir Mohammad Tahmasebi Maraghoosh, Arlington, MA (US); Ioannis Paschalidis, Lincoln, MA (US)

(73) Assignee: Koninklijke Philips N.V., Eindhoven (NL)

( * ) Notice: Subject to any disclaimer, the term of this patent is extended or adjusted under 35 U.S.C. 154(b) by 402 days.

(21) Appl. No.: 17/290,444

(22) PCT Filed: Nov. 26, 2019

(86) PCT No.: PCT/EP2019/082519
§ 371 (c)(1),
(2) Date: Apr. 30, 2021

(87) PCT Pub. No.: WO2020/109277
PCT Pub. Date: Jun. 4, 2020

(65) Prior Publication Data
US 2021/0383066 A1 Dec. 9, 2021

Related U.S. Application Data

(60) Provisional application No. 62/772,661, filed on Nov. 29, 2018.

(51) Int. Cl.
*G06F 40/20* (2020.01)
*G06F 16/33* (2019.01)
(Continued)

(52) U.S. Cl.
CPC ........ *G06F 16/3344* (2019.01); *G06F 16/367* (2019.01); *G06F 18/214* (2023.01);
(Continued)

(58) Field of Classification Search
None
See application file for complete search history.

(56) References Cited

U.S. PATENT DOCUMENTS

| 8,751,218 B2 * | 6/2014 | Dang | ...................... G06F 40/30 706/55 |
| 9,058,374 B2 * | 6/2015 | Brennan | ........... G06F 16/24578 |

(Continued)

OTHER PUBLICATIONS

International Search Report for PCT/EP2019/082519 filed Nov. 26, 2019.

*Primary Examiner* — Richard Z Zhu

(57) ABSTRACT

A method (100) for generating a domain-specific training set, comprising: generating (130) a generic corpus comprising a plurality of tokenized documents, comprising: (i) parsing (132) a document retrieved from the generic corpus; (ii) preprocessing (134) the parsed document; (iii) tokenizing (136) the preprocessed document; and (iv) storing (138) the tokenized document in the generic corpus; generating (140) an ontology database of tokenized entries, comprising: (i) parsing (142) an ontology entry retrieved from an ontology; (ii) preprocessing (144) the parsed entry; (iii) tokenizing (146) the preprocessed entry; and (iv) storing (148) the tokenized entry in the ontology database; querying (150), using domain-specific tokenized entries from the ontology database, the tokenized documents in the generic corpus; identifying (160), based on the query, a plurality of tokenized documents specific to the domain; and storing (170), in a training set database, the identified tokenized documents as a training set specific to the domain.

15 Claims, 4 Drawing Sheets

(51) Int. Cl.
*G06F 16/36* (2019.01)
*G06N 20/00* (2019.01)
*G06F 40/284* (2020.01)
*G06F 40/205* (2020.01)
*G06F 18/214* (2023.01)
*G06F 18/10* (2023.01)
*G06F 40/211* (2020.01)
*G06F 40/279* (2020.01)
*G06F 40/295* (2020.01)

(52) U.S. Cl.
CPC .......... *G06F 40/205* (2020.01); *G06F 40/284* (2020.01); *G06N 20/00* (2019.01); *G06F 16/36* (2019.01); *G06F 18/10* (2023.01); *G06F 40/211* (2020.01); *G06F 40/279* (2020.01); *G06F 40/295* (2020.01)

(56) References Cited

U.S. PATENT DOCUMENTS

| | | | | |
|---|---|---|---|---|
| 9,336,306 | B2* | 5/2016 | McAteer | G06F 16/367 |
| 9,678,946 | B2* | 6/2017 | Nauze | G06F 40/237 |
| 10,120,861 | B2* | 11/2018 | Scally | G06F 40/30 |
| 10,217,377 | B2* | 2/2019 | Byron | G09B 5/02 |
| 10,331,763 | B2* | 6/2019 | Subramanian | G06F 40/10 |
| 11,049,042 | B2* | 6/2021 | Neelamana | G06N 20/00 |
| 2005/0060150 | A1* | 3/2005 | Li | G06F 40/53 |
| | | | | 704/240 |
| 2008/0262826 | A1 | 10/2008 | Pacull | |
| 2015/0178386 | A1* | 6/2015 | Oberkampf | G06F 16/367 |
| | | | | 707/749 |
| 2018/0150459 | A1* | 5/2018 | Farid | G06F 16/93 |
| 2020/0160231 | A1* | 5/2020 | Asthana | G06F 16/9024 |

* cited by examiner

METHOD AND SYSTEM FOR CREATING A DOMAIN-SPECIFIC TRAINING CORPUS FROM GENERIC DOMAIN CORPORA

CROSS-REFERENCE TO PRIOR APPLICATIONS

This application is the U.S. National Phase application under 35 U.S.C. § 371 of International Application No. PCT/EP2019/082519, filed on Nov. 26, 2019, which claims the benefit of U.S. Patent Application No. 62/772,661, filed on Nov. 29, 2018. These applications are hereby incorporated by reference herein.

FIELD OF THE DISCLOSURE

The present disclosure is directed generally to machine learning methods and systems and more particularly, but not exclusively, to creation of training sets for use in training language models.

BACKGROUND

Machine learning techniques, including deep learning, are increasingly being utilized for natural language processing (NLP) applications. NLP applications exist in an ever-growing array of domains including finance and healthcare. Some such applications include, for example, named entity recognition (NER) and classification, among many others. In the healthcare domain, it would be highly desirable to bring automation to clinical workflows for ease of access to clinically relevant patient data and decision support.

Development of most machine learning algorithms for Natural Language Processing tasks such as NER typically requires large amounts of labeled training data. Studies have shown, however, that generic data sources are not well-suited for training models for domain-specific applications. Accordingly, it is a challenge to obtain a large amount of domain-specific corpora, especially in domains such as healthcare, for developing NLP capabilities. Researchers may obtain access to data from a few clinical sites, but the data may still not provide a comprehensive view of the domain and therefore, models trained on such limited data may not generalize well. Because of this, training a model on such data for use at other sites may present problems such as out-of-vocabulary inputs, misclassification, and other limitations.

SUMMARY OF THE DISCLOSURE

There is a continued need for improved corpora of training data, such as in the healthcare area, and for methods and systems to generate these corpora. Various embodiments described herein relate to a method, related apparatus, and non-transitory machine-readable medium, for creating a domain-specific training set, the method including extracting at least one keyword from a domain-specific ontology; querying a generic domain corpus using the at least one keyword to obtain at least one matching article; adding the at least one matching article to a domain-specific training set. The system generates a generic corpus comprising a plurality of tokenized documents obtained from one or more sources, and generates an ontology database of tokenized ontology entries. The tokenized documents in the generic corpus are queried using one or more domain-specific tokenized entries from the ontology database, and thus a plurality of tokenized documents specific to the domain are identified. The system stores the identified plurality of tokenized documents as a training set specific to the domain.

Generally, in one aspect, a method for generating a domain-specific training set is provided. The method includes: (i) generating a generic corpus comprising a plurality of tokenized documents obtained from one or more sources, comprising: parsing a document retrieved from the generic corpus or from another source of documents; preprocessing the parsed document; tokenizing the preprocessed document; and storing the tokenized document in the generic corpus; (ii) generating an ontology database of tokenized entries, comprising: parsing an ontology entry retrieved from an ontology; preprocessing the parsed entry; tokenizing the preprocessed entry; and storing the tokenized entry in the ontology database; (iii) querying, using one or more domain-specific tokenized entries from the ontology database, the tokenized documents in the generic corpus; (iv) identifying, based on the query, a plurality of tokenized documents specific to the domain; and (v) storing, in a training set database, the identified plurality of tokenized documents as a training set specific to the domain.

According to an embodiment, the method further includes: retrieving a domain-specific training set from the training set database; and training a machine learning algorithm directed to the domain of the retrieved domain-specific training set, thus generating a domain-specific trained algorithm. According to an embodiment, a user identifies a domain-specific training set to retrieve from the training set database.

According to an embodiment, the method further includes: retrieving one or more documents from a plurality of sources; and storing content from the one or more documents in a corpus database.

According to an embodiment, the one or more domain-specific tokenized entries used to query the tokenized documents in the generic corpus is selected by a user.

According to an embodiment, the domain-specific tokenized entry used to query the tokenized documents in the generic corpus further comprises one or more synonyms for that entry.

According to an embodiment, identifying a plurality of tokenized documents specific to the domain comprises matching using rule-based or feature-based matching.

According to an embodiment, the training set database comprises a plurality of stored domain-specific training sets.

According to as aspect is a system for generating a domain-specific training set. The system includes: a corpus database comprising a plurality of documents obtained from one or more sources; an ontology database comprising an ontology; and a processor configured to: (i) generate a generic corpus comprising a plurality of tokenized documents obtained from one or more sources, comprising: parsing documents from the corpus database; preprocessing the parsed document; tokenizing the preprocessed document; and storing the tokenized document in the generic corpus; (ii) generate an ontology database of tokenized entries, comprising: parsing an ontology entry retrieved from an ontology; preprocessing the parsed entry; tokenizing the preprocessed entry; and storing the tokenized entry in the ontology database; (iii) query the tokenized documents in the generic corpus using one or more domain-specific tokenized entries from the ontology database; (iv) identify, based on the query, a plurality of tokenized documents specific to the domain; and (v) store the identified plurality of tokenized documents as a training set specific to the domain.

According to an embodiment, the system further includes a processor configured to: (i) retrieve a domain-specific training set from the training set database; and (ii) train a machine learning algorithm directed to the domain of the retrieved domain-specific training set, thus generating a domain-specific trained algorithm.

According to an embodiment, the system further includes a user interface, wherein the user interface is configured to receive an identification of a domain-specific training set to retrieve from the training set database.

According to an embodiment, the one or more domain-specific tokenized entries used to query the tokenized documents in the generic corpus is selected by a user via a user interface.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various embodiments of a system and method configured to generate a large, domain-specific corpus of training data. More generally, Applicant has recognized and appreciated that it would be beneficial to provide a system that creates improved corpora of training data from one or more sources. The system generates a generic corpus comprising a plurality of tokenized documents obtained from one or more sources, and generates an ontology database of tokenized ontology entries. The tokenized documents in the generic corpus are queried using one or more domain-specific tokenized entries from the ontology database, and thus a plurality of tokenized documents specific to the domain are identified. The system stores the identified plurality of tokenized documents as a training set specific to the domain.

Accordingly, as described herein, various embodiments are presented for generating a corpus of domain-specific training data for use in training a natural language processing or other language model. According to such embodiments, a domain-specific ontology is leveraged to automatically extract domain-relevant examples from one or more generic domain corpora.

Figure 1:
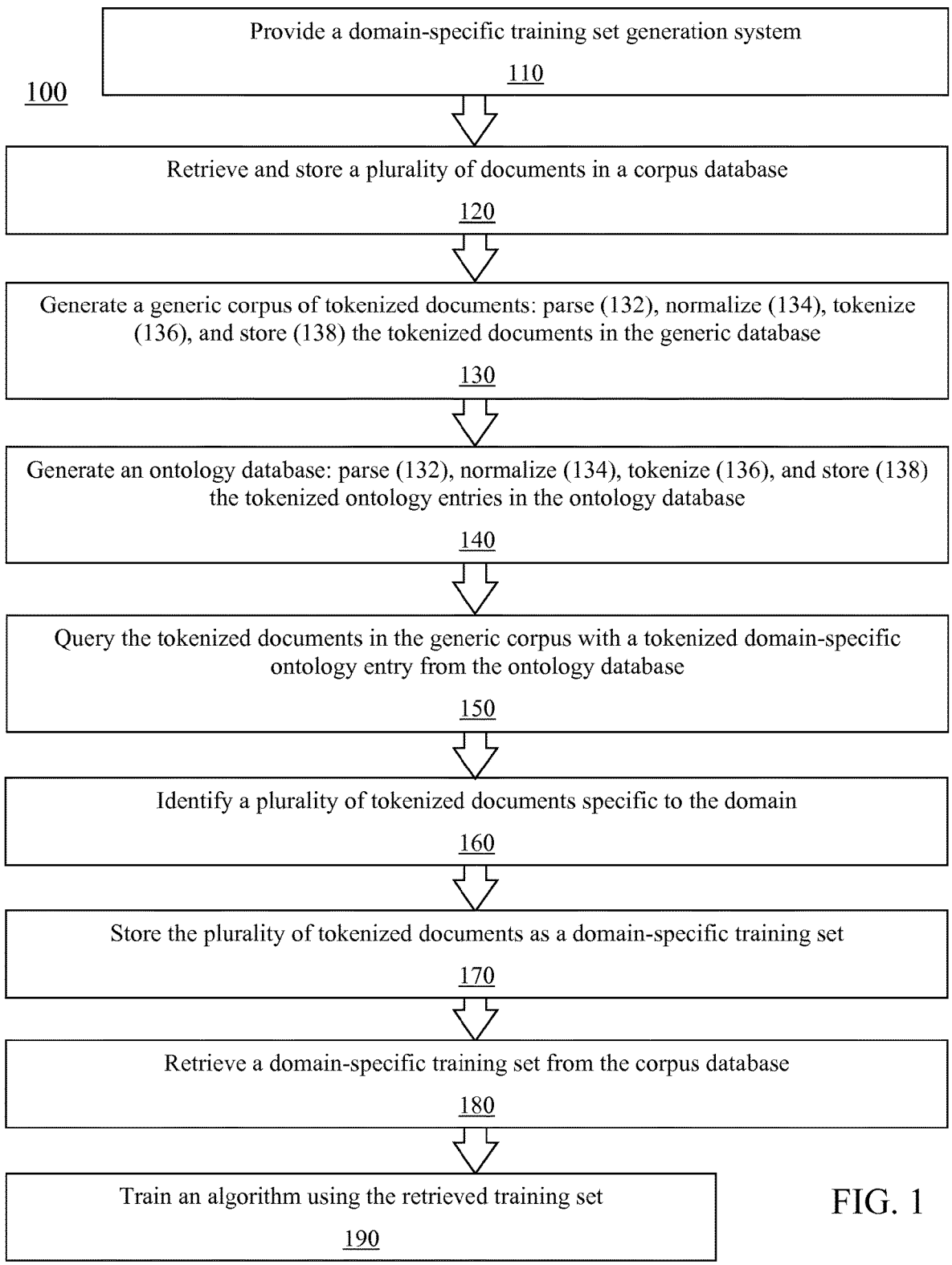
FIG. 1 is a flowchart of a method for generating domain-specific training data, in accordance with an embodiment.

Referring to FIG. 1, in one embodiment, is a flowchart of a method 100 for generating a corpus of training data using a training set generation system. The methods described in connection with the figures are provided as examples only, and shall be understood not to limit the scope of the disclosure. At step 110 of the method, a domain-specific training set generation system (400) is provided. The training set generation system can be any of the systems described or otherwise envisioned herein.

At step 120 of the method, a plurality of documents is retrieved or otherwise identified or accumulated from one or more sources. These documents form an initial generic corpus, and a sub-set of these documents will be used to generate a domain-specific training set or training corpus according to the methods and systems described or otherwise envisioned herein. At step 122, the retrieved or identified plurality of documents is stored in the initial generic corpus database.

The one or more sources from which the plurality of documents is retrieved or identified can be any source. According to an embodiment, at least some of the sources may be specific to or otherwise relevant to an intended use of a generated training set, although in another embodiment the sources may be agnostic to any intended use of a generated training set. The following are provided as a few non-limiting examples of possible sources of documents, although many other sources are possible: Arxiv, BioRxiv, Google News, Google Scholar, PMC, PubMed, Wikipedia, WikiBook, Common Crawl, and others.

It is understood that the word "document" may refer to any physical or digital content. For example, a document can be any text, document, or other record or source comprising text, images, or other content. According to an embodiment, the documents are digital or digitized document. For example, the document may be journals, databases, clinical information, lab reports, and/or any other information. These are just examples and not meant to be exhaustive. The document can be provided to the system by an individual or another system. Additionally and/or alternatively, the document can be retrieved by the system. For example, the system may continuously or periodically access a database, website, or any other resource comprising or providing documents.

Figure 2:
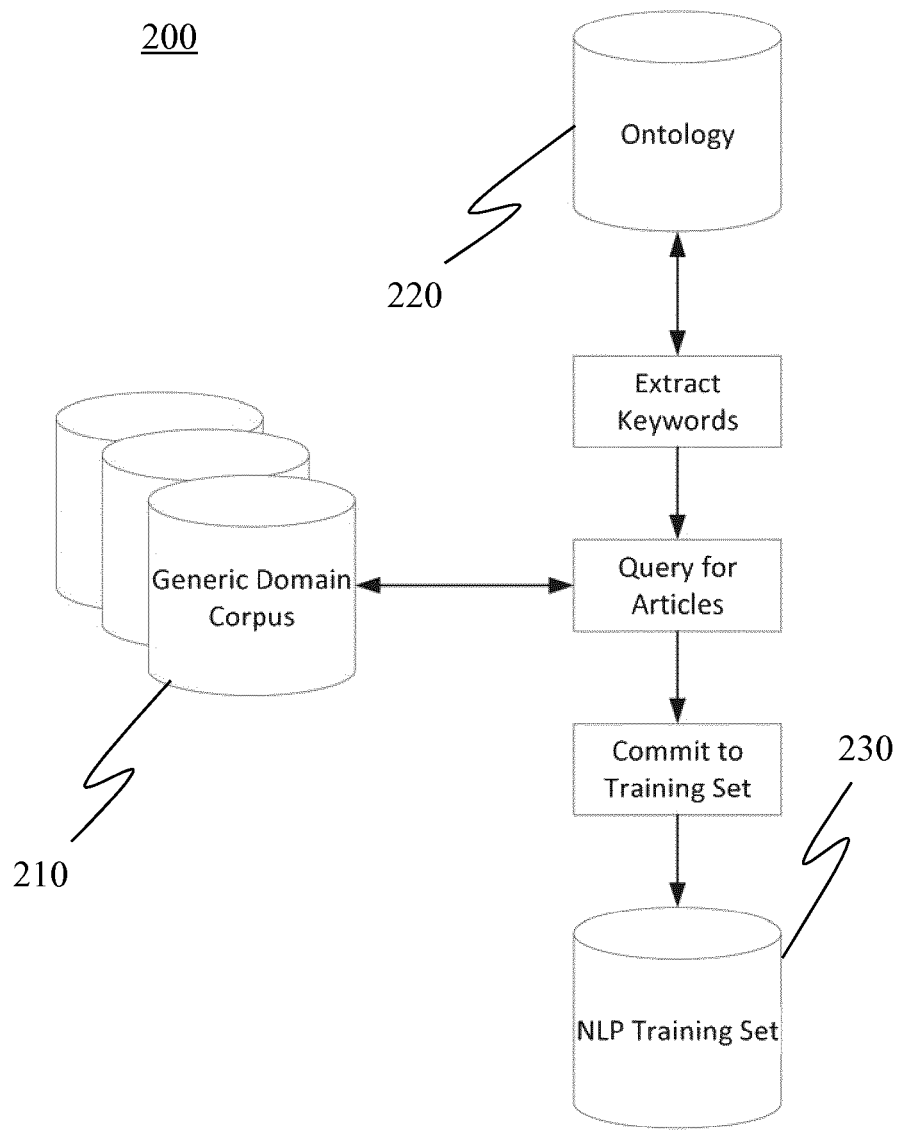
FIG. 2 is a schematic representation of a system for generating domain-specific training data, in accordance with an embodiment.

Referring to FIG. 2, in one embodiment, is shown a generic corpus database 210. The initial generic corpus database may be stored in a local or remote database for use by the domain-specific training set generation system. For example, the system may comprise a database to store the corpus, and/or may be in communication with a database storing the corpus. These databases may be located with the system or may be located remote from the system, such as in cloud storage and/or other remote storage.

At step 130 of the method, the system generates a generic corpus database 210 comprising a plurality of tokenized documents from the initial generic corpus. This results in a plurality of plurality of tokenized documents in a corpus database 210 ready for querying using one or more queries.

Step 130 comprises one or more of a plurality of sub-steps. For example, at step 132 of the method, the system parses a document pulled from or found in the initial generic corpus. Parsing of the document can be achieved using a parser or a parsing algorithm. Parsing the document results in creation of a hierarchical data-structure based representation of the document, which will facilitate downstream steps of the method. For example, the hierarchical data-structure based representation of the document may comprise fields or levels such as title of the document, headings of the document, textual content of the document, and many other fields or levels of the hierarchy. Typically this structural representation also comprises information about relationships of one or more hierarchical levels to one or more other hierarchical levels.

At step 134 of the method, the system preprocesses the parsed document. For example, the system may preprocess the parsed document to remove irrelevant terms such as HTML tags, to remove images, and preprocess numbers to unique numbers, among many other modifications. The data may be preprocessed in any way that enables rapid and efficient searching of the data in downstream steps of the method. Preprocessing can be accomplished using a normalizer or preprocessing algorithm or approach.

At step 136 of the method, the system tokenizes the preprocessed text, breaking down into sentences and/or tokens, words, or other components. Tokenization further facilitates rapid and efficient searching of the data in downstream steps of the method. Tokenization can be achieved using a tokenizer or tokenizing algorithm or approach. Examples of tokenizers include NTKL, Spacy, and CoreNLP, among many others.

In addition to the above, the processing of the retrieved documents may include translation of extracted text and many other forms or kinds of processing. The system may process each document as it is received, or may process documents in batches, or may process documents just before they are analyzed in a subsequent step of the method.

At step 138 of the method, the system stores the tokenized document information in the corpus database 210. The tokenized document information may be stored in the database in any format. According to an embodiment, the tokenized document information is stored in the database in a format configured to facilitate rapid and efficient searching of the data, such as in JSON format although many other formats are possible.

In various embodiments every article in the generic corpus database may be structured to ease the keyword match. For example, the title of the article may contain the desired keyword. A figure or table caption within the article may contain the keyword. Such information can be processed, extracted and stored in a structured format for easy access for matching.

At step 140 of the method, which may be performed before, during, and/or after step 130 of the method, the system generates an ontology database 220 comprising a plurality of tokenized ontology entries. This results in a plurality of tokenized ontology entries in an ontology database 220 each of which may be utilized to query the tokenized documents in a corpus database 210.

The ontology database 220 may be or comprise any public or private ontology. For example, in the field of healthcare, the method may utilize an ontology such as SNOMED, MeSH, RADLEX, or UMLS. Many other ontologies are possible. The ontology database may be in virtually any format, such as JSON among many others.

Step 140 comprises one or more of a plurality of sub-steps. For example, at step 142 of the method, the system parses one or more ontology entries pulled from or found in the ontology of the initial ontology database. Parsing of one or more ontology entries can be achieved using a parser or a parsing algorithm. Parsing the ontology results in creation of a hierarchical data-structure based representation of the ontology, which will facilitate downstream steps of the method. Often this structural representation also comprises information about relationships of one or more hierarchical levels to one or more other hierarchical levels, thus comprising information about relationships between one or more ontology entries.

At step 144 of the method, the system preprocesses the parsed one or more ontology entries. For example, the system may preprocess the parsed ontology entries to remove irrelevant or unnecessary information, among many other modifications. The data may be preprocessed in any way that enables rapid and efficient retrieval of domain-specific ontology entries in downstream steps of the method. Preprocessing can be accomplished using a normalizer or preprocessing algorithm or approach.

At step 146 of the method, the system tokenizes the preprocessed ontology entries, breaking into tokens, words, or other components. Tokenization further facilitates rapid and efficient retrieval of domain-specific ontology entries in downstream steps of the method. Tokenization can be achieved using a tokenizer or tokenizing algorithm or approach. Examples of tokenizers include NTKL, Spacy, and CoreNLP, among many others.

In addition to the above, the processing of the retrieved ontology entries may include translation of extracted text and many other forms or kinds of processing. The system may process each ontology entry as it is received, or may process ontology entries in batches, or may process ontology entries just before they are used in a step of the method.

At step 148 of the method, the system stores the tokenized ontology entries in the ontology database 220. The tokenized ontology information may be stored in the database in any format. According to an embodiment, the tokenized ontology information is stored in the database in a format configured to facilitate rapid and efficient retrieval of tokenized entries, such as in JSON format although many other formats are possible.

At step 150 of the method, the system queries the plurality of tokenized documents in the generic corpus database 210 using one or more tokenized entries from the ontology database 220. Any of the tokenized entries from the ontology database may be used to query the generic corpus database 210. According to an embodiment, the search is performed to generate a list of domain-relevant or domain-specific documents for inclusion in a domain-relevant or domain-specific training set. The system may iterate through ontology entries and documents to locate domain-relevant and/or—specific documents.

The one or more ontology entries used to query the processed documents in the generic corpus database may be any of the processed entries from the ontology database. For example, the system may automatically identify one or more entries based on a desired domain of the training set. Thus, 'diabetes' may be an entry identified by the system if the desired domain of the training set is diabetes. Alternatively, a domain-specific tokenized entries used to query the tokenized documents in the generic corpus may be selected by a user. For example, a user with an understanding of the desired domain of a domain-specific training set to be generated can select one or more ontology entries based on that understanding. Thus, the system may comprise a user interface configured to display ontology entries and receive an input from the user comprising a selection of one or more entries for the query.

According to an embodiment, the query may simply be an ontology keyword while, in others, the query may be expanded according to various methods such as, for example, including alternate forms of the keyword or synonyms thereof. The user interface and system may be configured, for example, to generate or otherwise identify one or more synonyms and/or otherwise related entries once an entry is identified. Thus, the user interface may be further configured to allow the user to select or de-select an option to utilize synonyms and/or otherwise related entries.

According to an embodiment, the matching may be performed according to various methods or combinations thereof. For example, matching may be performed using rule-based exact-term matching or using a word2vec/feature-based matching through a machine learning framework (i.e., an additional machine learning model useful for matching text, separate from the language model to be trained).

At step 160 of the method, the querying of the plurality of tokenized documents in the generic corpus database using one or more tokenized ontology entries identifies one or more domain-specific documents. Due to the use of a domain-specific ontology entry to search the document database, more relevant documents are automatically identified by the system.

According to an embodiment, the system may identify a single set of documents using a single query. Alternatively, the system may identify sets of documents in multiple rounds of querying, using one or more queries. For example, according to an embodiment, as the system iterates through the keyword and articles, each time a "hit" is located, it is added to the training set. After completion of the method, the training set has been populated with documents from the generic corpus that are relevant to the domain of interest, generating a domain-specific training set.

At step 170 of the method, the identified plurality of tokenized documents is stored as a domain-specific training set in a training set database. Referring to FIG. 2, in one embodiment, is shown a training set database 230. The training set database 230 may be a local or remote database for use by the domain-specific training set generation system. For example, the system may comprise a training set database, and/or may be in communication with a training set database. These databases may be located with the system or may be located remote from the system, such as in cloud storage and/or other remote storage.

At step 180 of the method, a domain-specific training set is retrieved from the training set database 230. The database may comprise a plurality of training sets each specific or otherwise relevant to a domain, and thus a specific training set will be identified for use by a system. For example, a user with an understanding of the desired domain of a domain-specific training set to be used can select a training set or a query for a training set based on that understanding. Thus, the training sets will comprise a method for identification, such as some identifier, a list or association of the ontology entries utilized for the generation of the training set, keywords found in the training set, or any other method or identifier. The system may comprise a user interface configured to display identifiers used to find a training set and/or receive query input to search for a training set. The user interface and system may be configured, for example, to utilize synonyms and/or otherwise related terms once a query is received or an identifier is selected. Thus, the user interface may be further configured to allow the user to select or de-select an option to utilize synonyms and/or otherwise related terms.

According to an embodiment, a plurality of identified possibly-relevant domain-specific training sets may be returned to the user. Thus, the user interface is configured such that the user can select among the identified domain-specific training sets for use. The one or more identified domain-specific training sets are thus retrieved, where retrieval may comprise a simple identification of the domain-specific training set(s), extraction or copying of the domain-specific training set(s), transmission of the domain-specific training set(s), or any other selection.

At step 190 of the method, a machine learning algorithm directed directly or tangentially to the domain of the retrieved domain-specific training set(s) is trained using the one or more retrieved domain-specific training set(s). There are a wide variety of mechanisms used to train an algorithm with a training set, and any of those may be utilized. The output is thus a trained and highly-skilled machine learning algorithm in the desired domain(s).

One of the many benefits of the systems described or otherwise envisioned is the implementation of a generated domain-specific training set in the form of training a machine learning algorithm in the desired domain(s). Training a machine learning algorithm using a more focused and specific training set significantly improves the training of the algorithm, and thus improves downstream processing by that highly-skilled trained algorithm.

Figure 3:
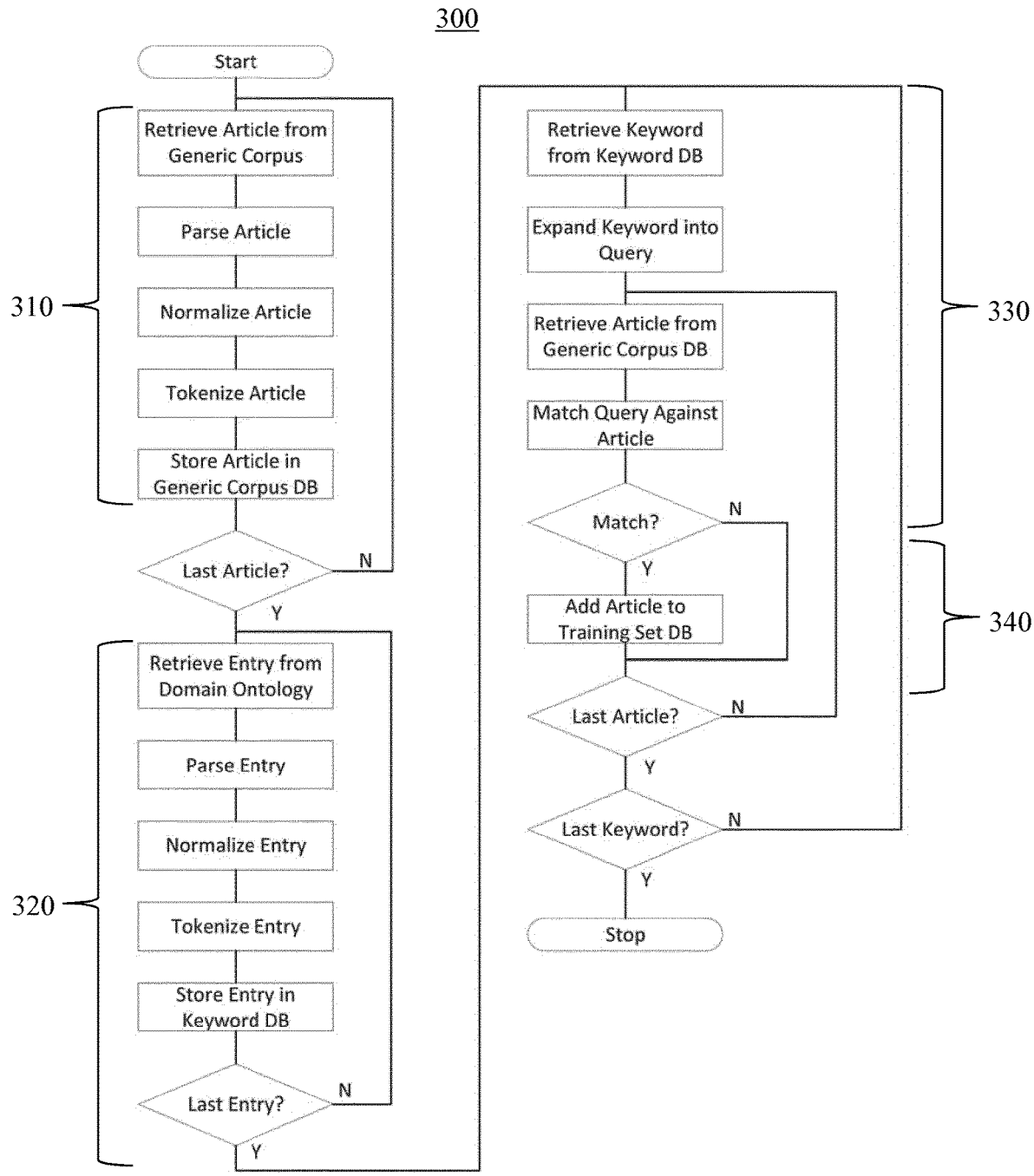
FIG. 3 is a flowchart of a method for generating domain-specific training data, in accordance with an embodiment.

Referring to FIG. 3 is a flowchart of a method 300 for generating a corpus of training data using a training set generation system. As with FIG. 1, the method comprises the step of generating (310) a generic corpus comprising a plurality of tokenized documents obtained from one or more sources. The method further comprises the step of generating (320) an ontology database of tokenized entries. One or more domain-specific tokenized entries from the ontology database are used to query (330) the tokenized documents in the generic corpus to identify a plurality of tokenized documents specific to the domain. These identified pluralities of tokenized documents are stored (340) in the training set database as a training set specific to the domain.

Figure 4:
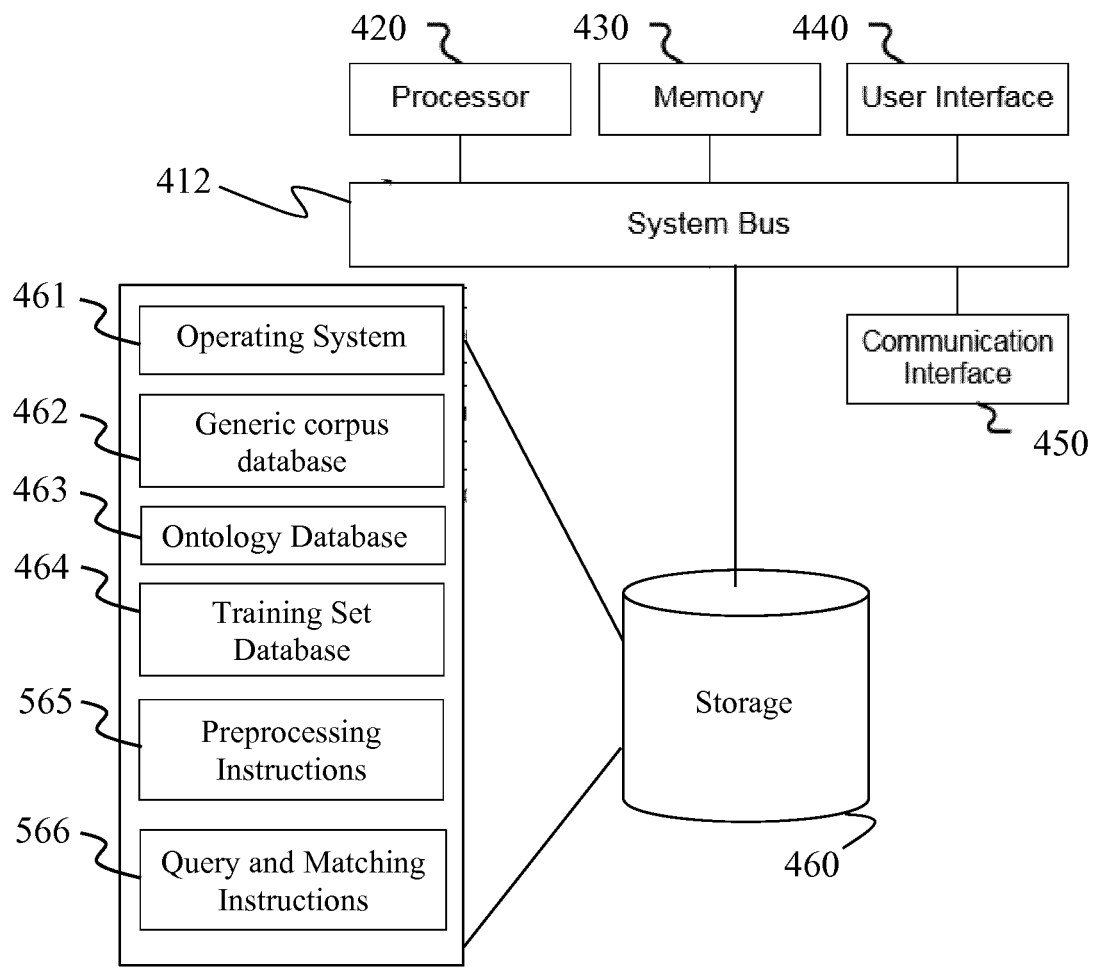
FIG. 4 is a schematic representation of a system for generating domain-specific training data, in accordance with an embodiment.

Referring to FIG. 4, in one embodiment, is one embodiment, is a schematic representation of a domain-specific training set generation system configured to generate a domain-specific training set. System 400 may be any of the systems described or otherwise envisioned herein, and may comprise any of the components described or otherwise envisioned herein.

According to an embodiment, system 400 comprises one or more of a processor 420, memory 430, user interface 440, communications interface 450, and storage 460, interconnected via one or more system buses 412. It will be understood that FIG. 4 constitutes, in some respects, an abstraction and that the actual organization of the components of the system 400 may be different and more complex than illustrated.

According to an embodiment, system 400 comprises a processor 420 capable of executing instructions stored in memory 430 or storage 460 or otherwise processing data to, for example, perform one or more steps of the method. Processor 420 may be formed of one or multiple modules. Processor 420 may take any suitable form, including but not limited to a microprocessor, microcontroller, multiple microcontrollers, circuitry, field programmable gate array (FPGA), application-specific integrated circuit (ASIC), a single processor, or plural processors.

Memory 430 can take any suitable form, including a non-volatile memory and/or RAM. The memory 430 may include various memories such as, for example L1, L2, or L3 cache or system memory. As such, the memory 430 may include static random access memory (SRAM), dynamic RAM (DRAM), solid state memory, flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 400. It will be apparent that, in embodiments where the processor implements one or more of the functions described herein in hardware, the software described as corresponding to such functionality in other embodiments may be omitted.

User interface 440 may include one or more devices for enabling communication with a user. The user interface can be any device or system that allows information to be conveyed and/or received, and may include a display, a mouse, and/or a keyboard for receiving user commands. In some embodiments, user interface 440 may include a command line interface or graphical user interface that may be presented to a remote terminal via communication interface 450. The user interface may be located with one or more other components of the system, or may located remote from the system and in communication via a wired and/or wireless communications network.

Communication interface 450 may include one or more devices for enabling communication with other hardware devices. For example, communication interface 450 may include a network interface card (NIC) configured to communicate according to the Ethernet protocol. Additionally, communication interface 450 may implement a TCP/IP stack for communication according to the TCP/IP protocols. Various alternative or additional hardware or configurations for communication interface 450 will be apparent.

Database or storage 460 may include one or more machine-readable storage media such as read-only memory (ROM), random-access memory (RAM), magnetic disk storage media, optical storage media, flash-memory devices, or similar storage media. In various embodiments, database 460 may store instructions for execution by processor 420 or data upon which processor 420 may operate. For example, database 460 may store an operating system 461 for controlling various operations of system 400.

It will be apparent that various information described as stored in database 460 may be additionally or alternatively stored in memory 430. In this respect, memory 430 may also be considered to constitute a storage device and database 460 may be considered a memory. Various other arrangements will be apparent. Further, memory 430 and database 460 may both be considered to be non-transitory machine-readable media. As used herein, the term non-transitory will be understood to exclude transitory signals but to include all forms of storage, including both volatile and non-volatile memories.

While training set generation system 400 is shown as including one of each described component, the various components may be duplicated in various embodiments. For example, processor 420 may include multiple microprocessors that are configured to independently execute the methods described herein or are configured to perform steps or subroutines of the methods described herein such that the multiple processors cooperate to achieve the functionality described herein. Further, where one or more components of system 400 is implemented in a cloud computing system, the various hardware components may belong to separate physical systems. For example, processor 420 may include a first processor in a first server and a second processor in a second server. Many other variations and configurations are possible.

According to an embodiment, training set generation system 400 may comprise one or more databases which may be stored within storage 460 or elsewhere. These may be local or remotely stored, and may be part of the system or may only be accessed by or otherwise available to the system. For example, the system may comprise a generic corpus database 462 comprising a plurality of documents retrieved or otherwise identified or accumulated from one or more sources, as well as the preprocessed forms of those documents suitable for downstream steps of the system. The system may also comprise an ontology database 463 comprising an ontology, as well as a preprocessed form of the ontologies entries suitable for downstream steps of the system. The system may also comprise a domain-specific training set database 464 comprising one or more stored domain-specific training sets generated by the systems and methods described or otherwise envisioned herein.

According to an embodiment, training set generation system 400 may store or comprise one or more algorithms, engines, and/or instructions to carry out one or more functions or steps of the methods described or otherwise envisioned herein. The system may comprise, among other instructions, preprocessing instructions 465, and query and matching instructions 466, among many other instructions. Indeed the system may store additional software components required to execute the functionality described herein, which also may control operations of hardware 400.

According to an embodiment, preprocessing instructions 465 may operate to direct the system to parse, preprocess, tokenize, and store documents from the initial generic corpus, and/or ontology entries from the ontology database. Thus, the preprocessing instructions may include instructions for parsing, preprocessing, and tokenizing these texts and entries. The system may then comprise a corpus database 210 comprising tokenized document information, and an ontology database 220 comprising tokenized ontology entry information.

According to an embodiment, query and matching instructions 466 may operate to identify matches between ontology entries in a query and one or more documents in corpus database 210. Thus the matching instructions may determine whether an article matches a query (e.g. rules based, word2vec, or other machine learning approaches).

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for generating a domain-specific training set, comprising:
    generating a generic corpus comprising a plurality of tokenized documents obtained from one or more sources, comprising: (i) parsing a document retrieved from the generic corpus or from another source of documents; (ii) preprocessing the parsed document; (iii) tokenizing the preprocessed document; and (iv) storing the tokenized document in the generic corpus;
    generating an ontology database of tokenized entries, comprising: (i) parsing an ontology entry retrieved from an ontology; (ii) preprocessing the parsed entry; (iii) tokenizing the preprocessed entry; and (iv) storing the tokenized entry in the ontology database;
    querying using one or more domain-specific tokenized entries from the ontology database, the tokenized documents in the generic corpus;
    identifying, based on the query, a plurality of tokenized documents specific to the domain; and
    storing in a training set database, the identified plurality of tokenized documents as a training set specific to the domain.

2. The method of claim 1, further comprising:
    retrieving a domain-specific training set from the training set database; and
    training a machine learning algorithm directed to the domain of the retrieved domain-specific training set, thus generating a domain-specific trained algorithm.

3. The method of claim 2, wherein a user identifies a domain-specific training set to retrieve from the training set database.

4. The method of claim 1, further comprising the steps of:
    retrieving one or more documents from a plurality of sources; and storing content from the one or more documents in a corpus database.

5. The method of claim 1, wherein the one or more domain-specific tokenized entries used to query the tokenized documents in the generic corpus is selected by a user.

6. The method of claim 1, wherein the domain-specific tokenized entry used to query the tokenized documents in the generic corpus further comprises one or more synonyms for that entry.

7. The method of claim 1, wherein identifying a plurality of tokenized documents specific to the domain comprises matching using rule-based or feature based matching.

8. The method of claim 1, wherein the training set database comprises a plurality of stored domain-specific training sets.

9. A system for generating a domain-specific training set, comprising:
a corpus database comprising a plurality of documents obtained from one or more sources;
an ontology database comprising an ontology; and
a processor configured to: (i) generate a generic corpus comprising a plurality of tokenized documents obtained from one or more sources, comprising: parsing documents from the corpus database; preprocessing the parsed document; tokenizing the preprocessed document; and storing the tokenized document in the generic corpus; (ii) generate an ontology database of tokenized entries, comprising: parsing an ontology entry retrieved from an ontology; preprocessing the parsed entry; tokenizing the preprocessed entry; and storing the tokenized entry in the ontology database; (iii) query the tokenized documents in the generic corpus using one or more domain-specific tokenized entries from the ontology database; (iv) identify, based on the query, a plurality of tokenized documents specific to the domain; and (v) store the identified plurality of tokenized documents as a training set specific to the domain.

10. The system of claim 9, further comprising a processor configured to: (i) retrieve a domain-specific training set from the training set database; and (ii) train a machine learning algorithm directed to the domain of the retrieved domain-specific training set, thus generating a domain-specific trained algorithm.

11. The system of claim 10, further comprising a user interface, and wherein the user interface is configured to receive an identification of a domain-specific training set to retrieve from the training set database.

12. The system of claim 9, wherein the one or more domain-specific tokenized entries used to query the tokenized documents in the generic corpus is selected by a user via a user interface.

13. The system of claim 9, wherein the domain-specific tokenized entry used to query the tokenized documents in the generic corpus further comprises one or more synonyms for that entry.

14. The system of claim 9, wherein identifying a plurality of tokenized documents specific to the domain comprises matching using rule-based or feature-based matching.

15. The system of claim 9, wherein the training set database comprises a plurality of stored domain-specific training sets.

* * * * *